United States Patent
Ramachandra Iyer et al.

(10) Patent No.: US 10,841,653 B2
(45) Date of Patent: Nov. 17, 2020

(54) METHOD AND SYSTEM FOR PREVENTING UPLOAD OF MULTIMEDIA CONTENT WITH OBJECTIONABLE CONTENT INTO A SERVER

(71) Applicant: Wipro Limited, Bangalore (IN)

(72) Inventors: Manjunath Ramachandra Iyer, Bangalore (IN); Gopichand Agnihotram, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/370,899

(22) Filed: Mar. 30, 2019

(65) Prior Publication Data

US 2020/0267447 A1 Aug. 20, 2020

(30) Foreign Application Priority Data

Feb. 15, 2019 (IN) .............................. 201941006108

(51) Int. Cl.
- *H04N 21/454* (2011.01)
- *G06N 20/00* (2019.01)
- *G06K 9/00* (2006.01)
- *H04N 21/4545* (2011.01)

(52) U.S. Cl.
CPC ..... *H04N 21/4542* (2013.01); *G06K 9/00228* (2013.01); *G06N 20/00* (2019.01); *H04N 21/45452* (2013.01)

(58) Field of Classification Search
CPC .............. H04N 21/251; H04N 21/258; H04N 21/25891; H04N 21/2743; H04N 21/278
USPC ................................................. 725/114, 115
See application file for complete search history.

(56) References Cited

U.S. PATENT DOCUMENTS

| 5,696,869 A * | 12/1997 | Abecassis ................ G11B 7/14 |
| | | 348/E5.102 |
| 6,847,980 B1 | 1/2005 | Benitez et al. |
| 9,674,588 B2 | 6/2017 | Yu |
| 2011/0137845 A1 | 6/2011 | Ward |
| (Continued) | | |

FOREIGN PATENT DOCUMENTS

| CN | 102547794 A | 7/2012 |
| EP | 2393256 A1 | 12/2011 |

OTHER PUBLICATIONS

Schmidt, A., et al., "A Survey on Hate Speech Detection using Natural Language Processing", Proceedings of the Fifth International Workshop on Natural Language Proceedings for Social Media, Apr. 3-7, 2017, pp. 1-10.

(Continued)

*Primary Examiner* — Dominic D Saltarelli
(74) *Attorney, Agent, or Firm* — Finnegan, Henderson, Farabow, Garrett & Dunner, LLP (57) ABSTRACT

The present invention relates to the field of content identification and more particularly to detection and identification of objectionable content present in a multimedia content. The objectionable content is detected before the upload of the content to a server or social media and it alerts the user about the presence of objectionable content based on the intelligent analytics. Further, during the alerting process the proposed mechanism is configured to consider the consequences of publishing or uploading the given content to a server or social media. Further, it also analyses the potential viewers, their profile, profile of the characters in the multimedia content.

16 Claims, 6 Drawing Sheets

(56) References Cited

U.S. PATENT DOCUMENTS

2013/0340089 A1    12/2013  Steinberg et al.
2016/0055235 A1     2/2016  Zhang et al.
2016/0350675 A1    12/2016  Laks et al.

OTHER PUBLICATIONS

European Search Report issued in the European Patent Office in counterpart European Application No. 19166358.2, dated Oct. 31, 2019. 8 pages.

* cited by examiner

| Parameter | Value | Weightage |
|---|---|---|
| Viewer class for the message | Professional | 1 |
| | Unemployed | 2 |
| | Religious | 3 |
| | Hired | 4 |
| | criminal | 5 |
| | others | |
| Topic of message | History | 2 |
| | War | 2 |
| | Religion | 4 |
| | Science | 1 |
| | Politics | 2 |
| | Person | 2 |
| | Others | |
| Contacts of user who have the history of forwarding messages (for example more than 50%) | Contact 1 | 3 |
| | Contact 2 | 5 |
| | Contact 3 | 1 |
| Social media site planned to post | Facebook | 3 |
| | Twitter | 2 |
| | Quora | 1 |
| | Others | |
| Others | | |

METHOD AND SYSTEM FOR PREVENTING UPLOAD OF MULTIMEDIA CONTENT WITH OBJECTIONABLE CONTENT INTO A SERVER

TECHNICAL FIELD

The present disclosure relates to the field of processing of multimedia content. Particularly, but not exclusively, the present disclosure relates to a method and system for detection and identification of objectionable content in a multimedia content.

BACKGROUND

Nowadays social media is becoming very popular. Apart from connecting people it has also become a key platform for advertisement, idea or thought sharing, campaigning, and job recruitment. Users of social media post various kinds of text, images, speeches, news items, videos or combinations thereof. Along with various benefits, it comes with risks associated to misleading large number of people, promotion of fake news, sharing of objectionable and inappropriate content such as morphed images, hate speeches, glorifying of terrorism, violence enticement, and the like.

To solve a problem of objectionable content, social media platforms have implemented automated filtering and censoring mechanisms. The mechanisms include analysis of content by implementing cognitive mechanisms that identify the various objects being depicted in the image/video and accordingly, censors the content and notifies the user post upload.

Additionally, some of the social media platforms have implemented a manual content censorship process where users perform a manual review of content flagged by an automated system to minimize the objectionable content on the platform. Moreover, in some implementations, we see bots or crawlers reviewing popular and rapidly proliferating content and performing checks against system defined parameters based on the user upload history, affiliations of the user, content validation against other known trusted sources, and the like, and thereby taking a decision on the content censorship.

One existing method assigns a rating to text content based on keywords present in text and after the text content is uploaded. Another existing method assigns a probability of finding the objectionable content in a region of image or video or content under analysis. It is achieved based on feedback from various users in the social media to ascertain category of the content uploaded. Further, one can make use of a global data audit for blocking inappropriate content after it has been uploaded.

An issue with the existing methods is that the methods are mostly restricted to image or video cognition and object identification techniques. Users can dupe such filters or censoring mechanisms by using various content editing techniques such as applying masks, filters, and the like, that prevent automated characterization and identification of objectionable content within such images or videos.

Conventional approaches are grossly insufficient to perform a qualitative analysis of such content that border a central objectionable theme. This is especially true for content that promote a camouflaged objectionable agenda such as terrorism or far right or white supremacy themes through misleading and instigating vicious speeches or content. Such content is difficult to censor through existing prior art mechanisms since individual objects being depicted in the content may not necessarily be offensive and therefore are not filterable by censorship mechanisms. For example, a write-up about a prominent celebrity but promoting hatred and violence against the celebrity through misquoted facts, is missed out from being marked as objectionable content due to lack of content analysis.

Further, an issue with the existing prior arts is that they block or remove the objectionable content from the social media after it is uploaded and proliferated to an extent. There is no mechanism to warn the user before upload, while also indicating the objectionable part.

The information disclosed in this background of the disclosure section is only for enhancement of understanding of the general background of the invention and should not be taken as an acknowledgement or any form of suggestion that this information forms the prior art already known to a person skilled in the art.

SUMMARY

The shortcomings of the prior art are overcome, and additional advantages are provided through the provision of method of the present disclosure.

Additional features and advantages are realized through the techniques of the present disclosure. Other embodiments and aspects of the disclosure are described in detail herein and are considered a part of the claimed disclosure.

An embodiment of the present disclosure discloses a method of preventing upload of multimedia content with objectionable content into a server. The method comprises receiving the multimedia content from a user. Next, the objectionable content present in the multimedia content is identified. Further, an alert is provided to the user about the objectionable content present in the multimedia content while uploading to the server. Further, the objectionable content present in the multimedia content is deleted upon receiving instructions from the user in response to the alert provided to the user, thereby preventing the upload of the multimedia content with the objectionable content to the server.

An embodiment of the present disclosure discloses a computing unit for preventing upload of multimedia content with objectionable content into a server. The computing unit includes a processor and a memory communicatively coupled to the processor, wherein the memory stores the processor instructions, which, on execution, causes the processor to receive the multimedia content from a user; to identify the objectionable content present in the multimedia content; to provide an alert to the user about the objectionable content present in the multimedia content while uploading to the server; and to delete the objectionable content present in the multimedia content upon receiving instructions from the user in response to the alert provided to the user, thereby preventing the upload of the multimedia content with the objectionable content to the server.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "includes", "comprising", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or apparatus.

The figures and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Embodiments of the present disclosure relates to a method and system for preventing uploading of multimedia content with objectionable or inappropriate content into a server. The method comprises of identifying one or more characters or one or more objects along with the interactions between them and the environment or the context or the theme of the multimedia content. Further, sentiment is associated with one or more characters, the interactions and the theme identified. Next, the objectionable content is identified, and potential proliferation is analyzed. Finally, the user is alerted about the objectionable content present in the multimedia content.

Figure 1:
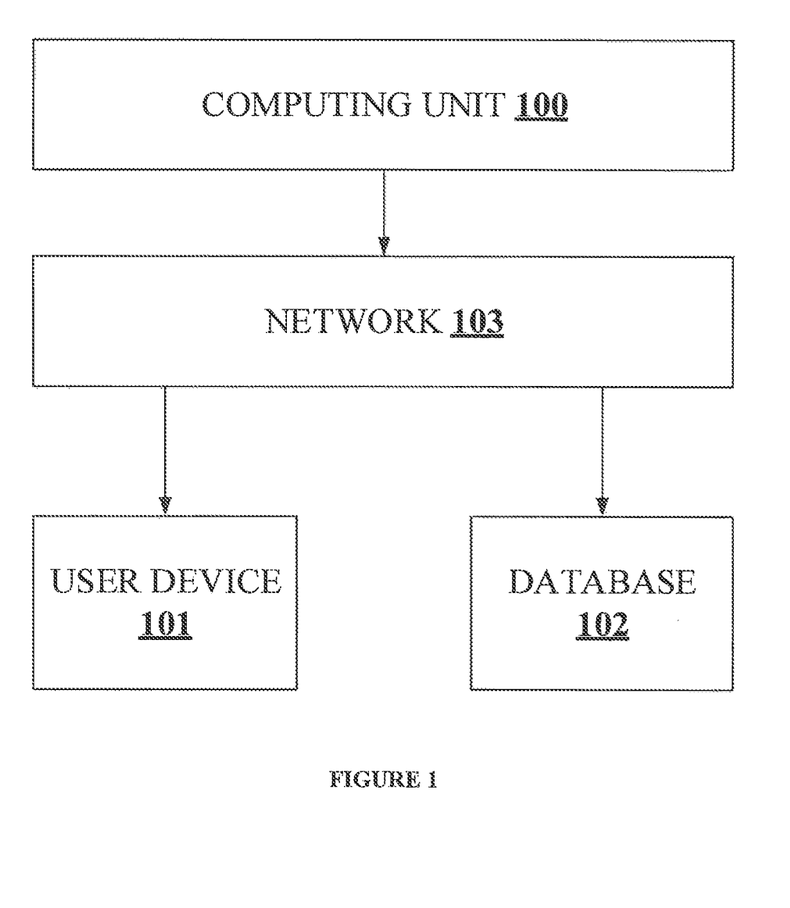
FIG. 1 shows an architecture diagram of a computing unit to identify the objectionable content present in a multimedia content before upload, in accordance with an embodiment of the present disclosure.

FIG. 1 illustrates an exemplary environment to identify the objectionable content present in a multimedia content before upload, in accordance with an embodiment of the present disclosure.

In some implementation, the environment includes a computing unit 100, a user device 101 and a database 102. In an embodiment, the user device 101 and the database 102 may be connected to the computing unit 100 through a network 103. The computing unit 100 receives a multimedia content from the user device 101 before the upload. The computing unit 100 identifies the objectionable content present in the multimedia content and its potential proliferation before the upload using the database 102. The computing unit 100 further alerts the user regarding the objectionable content and gives an option to the user to modify/remove the objectionable content present in the multimedia content. Upon removal or modification, the multimedia content is uploaded to the server (not shown in the figure). In an embodiment, the computing unit 100 may include for example, mobile phone, laptop, server. A person skilled in the art would understand that any other computing unit 100 which may be used to communicate with the user device 101, not mentioned explicitly, may also be used in the present disclosure. In an embodiment, the multimedia content may include text, image, video and combinations thereof.

In an embodiment the computing unit 100 may be present in the user device 101 or the server may act as a computing unit 100.

Figure 2:
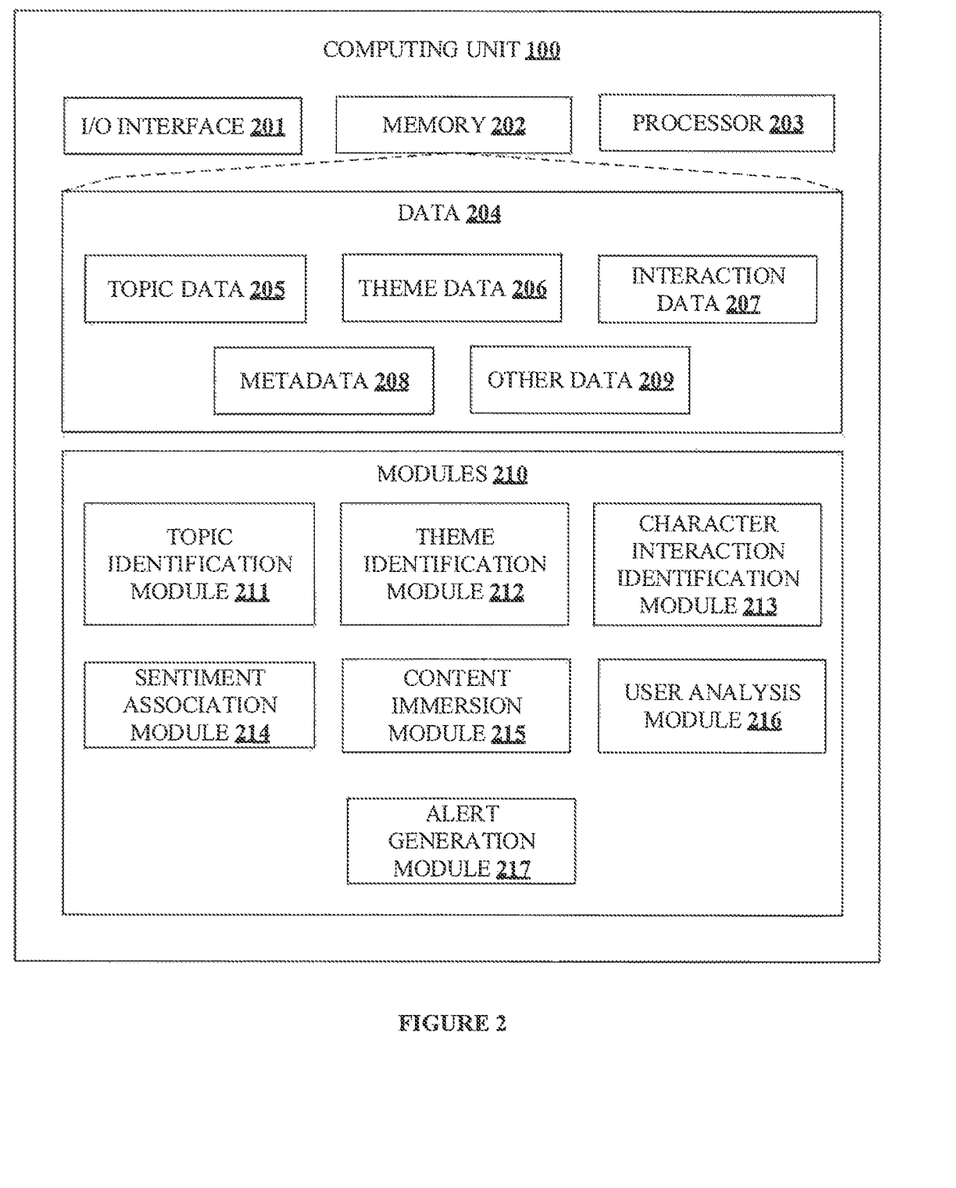
FIG. 2 shows an internal architecture of a computing unit for identifying the objectionable content present in a multimedia content before upload, in accordance with embodiments of the present disclosure.

FIG. 2 shows a detailed block diagram of a computing unit 100 for identifying the objectionable content present in a multimedia content before upload, in accordance with embodiments of the present disclosure. The computing unit 100 may include at least one Central Processing Unit (CPU or processor) 203 and a memory 202 storing instructions executable by the at least one processor 203. The processor 203 may include at least one data processor for executing program components for executing user or system-generated requests. The memory 202 is communicatively coupled to the processor 203. The computing unit 100 further comprises an Input/Output (I/O) interface 201. The I/O interface 201 is coupled with the processor 203 through which an input signal or/and an output signal is communicated.

In some implementations, the computing unit 100 may include data 204 and modules 210. As an example, the data 204 is stored in the memory 202 configured in the computing unit 100 as shown in the FIG. 2. In one embodiment, the data 204 may include, for example, topic data 205, theme data 206, interaction data 207, meta data 208 and other data 209. In the illustrated FIG. 2, modules 210 are described herein in detail.

In some embodiments, data 204 may be stored in the memory 202 in form of various data structures. Additionally, the data 204 may be organized using data models, such as relational or hierarchical data models. The other data 209 may store data, including temporary data and temporary files, generated by the modules 210 for performing the various functions of computing unit 100.

In an embodiment, the topic data 205 may include nouns and verbs, for example names of persons and animals. As an example, consider a text "John is hunting a bird sitting on a branch of the tree". With respect to the example, the person named "John", "bird" and "tree" can be stored as the topic data 205.

In an embodiment, the theme data 206 may include names of places and the environment of the multimedia content. With respect to the above-mentioned example, the action hunting usually happens in a forest or a jungle therefore the "forest" can be stored as the theme data 206.

In an embodiment, the interaction data 207 may include the actions performed by the characters or the objects in the multimedia content. With respect to the aforementioned example, the action "hunting" can be stored as the interaction data 207.

In an embodiment, the metadata 208 may include captions of the image, tags associated with the images or the video, the comments written to a multimedia content in a social media.

In some embodiments, the data 204 stored in the memory 202 may be processed by the modules 210 of the computing unit 100. The modules 210 may be stored within the memory 202. In an example, the modules 210 communicatively coupled to the processor 203 configured in the computing unit 100, may also be present outside the memory 202 as shown in FIG. 2 and implemented as hardware. As used herein, the term modules 210 may refer to an application specific integrated circuit (ASIC), an electronic circuit, a processor (shared, dedicated, or group) and memory that execute one or more software or firmware programs, a combinational logic circuit, and/or other suitable components that provide the described functionality.

In one implementation, the modules 210 may include, for example, a topic identification module 211, a theme identification module 212, a character interaction identification module 213, a sentiment association module 214, a content immersion module 215, a user analysis module 216 and an alert generation module 217. It will be appreciated that the modules 210 may be represented as a single module or a combination of different modules.

The processor 203 receives the multimedia content from the user device 101. In an embodiment, the topic identification module 211, the theme identification module 212 and the character interaction identification module 213 may receive the multimedia content from the processor 203. Further, the topic identification module 211 identifies the subjects, the objects and the characters present in the multimedia content. The theme identification module 212 identifies the predicates, constructs a context graph and based on the context graph the overall theme or the environment of the multimedia content is identified. The character interaction identification module 213 recognizes the actions performed between one or more subjects, the one or more objects and the one or more characters.

In an embodiment, the partial results of the topic and the theme identification modules are stored in the database 102. The sentiment association module 214, using the partial results of the other modules associates sentiments to the objects, the characters, and the subjects and the actions performed by them using one or more machine learning algorithms, for example Long Short Term Memory (LSTM). A person skilled in the art would understand that any other machine learning algorithm not mentioned explicitly, may also be used in the present disclosure.

In an embodiment, the content immersion module 215 using the associated sentiments identifies the objectionable content present in the multimedia content. The user analysis module 216 computes the sensitivity index and predicts the potential proliferation for the identified objectionable content. Further, the alert generation module 217 generates an alert to the user indicating the objectionable content in the multimedia content and its potential proliferation.

Figure 3:
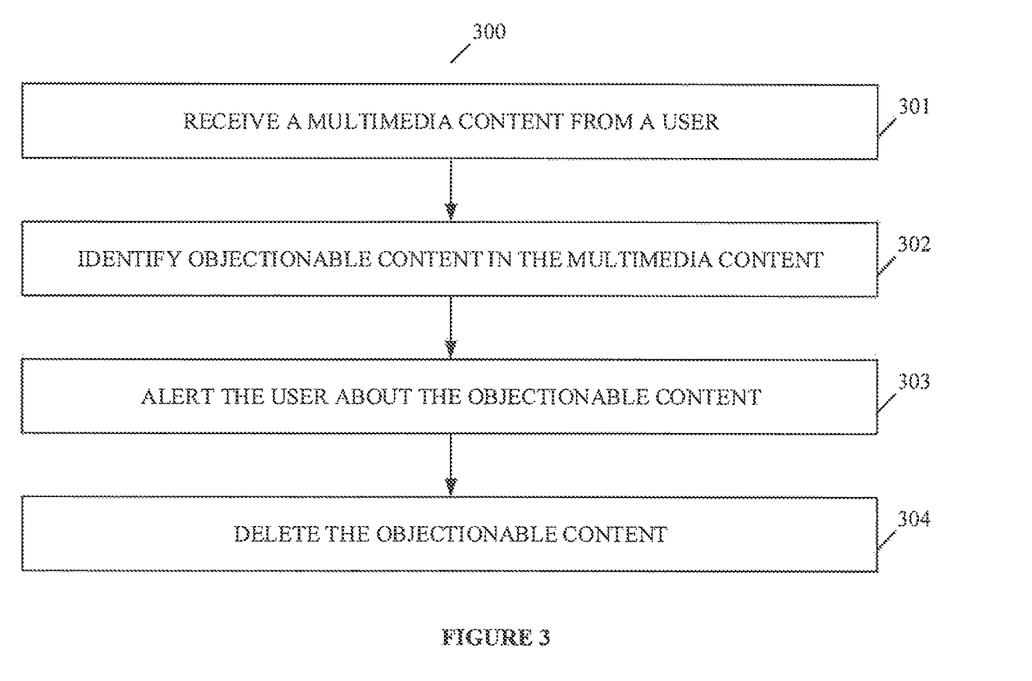
FIG. 3 shows an exemplary flow chart illustrating method steps for preventing the upload of the multimedia content with the objectionable content before upload, in accordance with embodiments of the present disclosure.

FIG. 3 shows an exemplary flow chart illustrating method steps for preventing the upload of the multimedia content with the objectionable content, in accordance with an embodiment of the present disclosure.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

Figure 4:
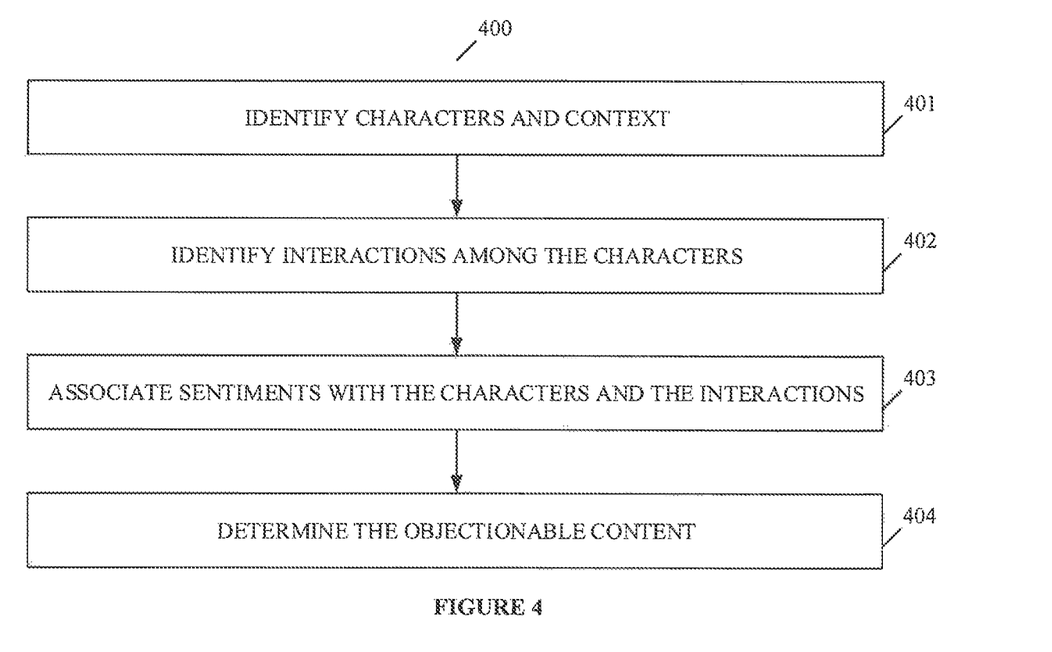
FIG. 4 shows an exemplary flow chart illustrating method steps for identifying the objectionable content present in the multimedia content, in accordance with embodiments of the present disclosure.

As illustrated in FIG. 3, the method 300 may include one or more steps for preventing the upload of the multimedia content with the objectionable content. At the step 301, the computing unit 100 receives the multimedia content from the user through a network 103 as shown in FIG. 1. At, the step 302, the computing unit 100 process the received multimedia content to identify the objectionable content before upload. Further, the FIG. 4 illustrates an exemplary method to identify the objectionable content present in the multimedia content before the upload, in accordance with an embodiment of the present disclosure.

At the step 401 the topic and the theme are derived. The step comprises of identifying all the topics or characters or subjects or objects present in the multimedia content. Next, the predicates and the user context are identified, along with the topics identified earlier a context graph is constructed. From the context graph the commonality of the specific context is identified as the theme or the environment of the multimedia content.

In an embodiment, for text-based multimedia content, to derive the topic, an attention word from the text is identified. To get the attention word, subject and predicate in the describing sentences are identified and the subject is separated out. A specific example, in the text "A bird is sitting on a tree" the topic is "bird". In one embodiment, if a sentence includes more than one subject, then based on the relative frequency of each subject, the subject with the highest relative frequency is taken as the attention topic. A person skilled in the art would understand that any other technique to determine the topic from the text, not mentioned explicitly, may also be used in the present disclosure.

In an embodiment, for image-based multimedia content, the objects in the images are identified based on image object recognition algorithms. Based on the relative visual prominence, scene context and image caption/title/metadata, the topic is determined. As an example, for an image of a bird sitting on a tree, the topic bird is identified through either object recognition of the bird or through the title of the image or through user tagging of similar images as "bird". A person skilled in the art would understand that any other technique which may be used to determine object from the image, not mentioned explicitly, may also be used in the present disclosure.

In an embodiment, for video-based content, the accompanying audio is transcribed to text using speech analytics and then a similar process as the text-based content is followed for topic determination. Also, as an additional step, frame by frame image analysis of the video is performed, to identify the objects present in the image frames as done in the image-based content described above. A person skilled in the art would understand that any other video analysis technique, not mentioned explicitly, may also be used in the present disclosure.

Further, in an embodiment after the identification of the topics in the multimedia content a context graph is constructed in a hierarchical manner that speak about the topics in a specific context. Based on the context graph the commonality of a specific context derived from the topics is chosen as the theme. Further, the chosen theme is also validated with the root word of the theme in the context graph.

Figure 5:
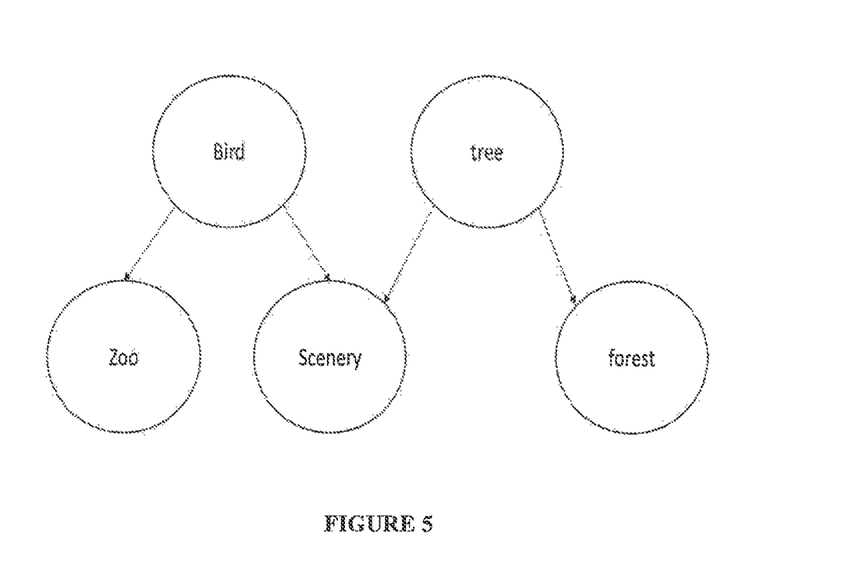
FIG. 5 shows an exemplary context graph, in accordance with an embodiment of the present disclosure, in accordance with embodiments of the present disclosure.

A specific example of the context graph is shown in FIG. 5, in accordance with an embodiment of the present disclosure. Let the user content comprise a text sentence as follows "A bird is sitting on a tree". Using the subject and predicate relationship the "bird" and the "tree" is identified as the topics. Further, using the context of the topics the theme is derived. The topic "bird" can be associated with the context "Zoo" and "Scenery". The topic "tree" can be associated with the context "forest" and "Scenery". The commonality of the context between the topics, that is "Scenery" is derived as the theme for the sentence provided by the user.

At the step 402, the interactions among the characters are identified. In an embodiment, the characters in the text are extracted through parsing and extracting the named entities. The surroundings of character determined by the interaction of the characters. In text data interaction is identified through subject and predicate relation. As an example, consider the text "Peter has supported people with money", here the "Peter" and "people" are the characters and the interaction is through "money".

In an embodiment, the characters in the image or video are extracted through any of the known technique may be used for the object extraction. Further, the interaction is extracted through a plurality of techniques. In one embodiment, the physical adjacency of objects is considered as interaction, for example consider an image where "John is standing in front of portrait". "John" and the "portrait" are the characters and the relation between them is "in front of". To extract the said relation using physical adjacency, the image is divided in to regions using watershed/region growing algorithm. All regions next to the region of (or within) the characters are identified, and the background is omitted.

Further, the image is also subjected to captioning. There can be more than one caption. For example, "man is in front of portrait"
"men are standing before artifact"
"John in front of portrait"
"Peter and John are in front of portrait"

Some of the captions put the names such as "John" based on the face recognition from database 102. The object in the caption extracted as for example man/men/john, peter, portrait is then corroborated with the interacting regions extracted from watershed algorithm and the interaction between the characters is derived.

At the step 403, sentiment association is done. The sentiments can be normal or objectionable (or forbidden). The sentiments are associated with the characters and the actions binding them by generating a sentiment graph based on the plurality of parameters. A typical sentiment graph for a text-based multimedia content is shown below:

subject→predicate→action→attributes→sentiment

The sentiment graph generation involves the following steps:
i. Attribute generation: The attributes of each of the characters are populated based on, for example historical transactions, social media opinions, internet and by the user. The procedure works on both image/video-based content and the text-based content.
ii. Action generation: The action relating the characters is derived from the predicate. Action can carry negative sentiments although characters themselves are normal. As a specific example consider a text "a bike hit a boy". The characters "bike" and "boy" are neutral but the action "hit" contributes for the negative sentiment.
iii. Sentiment generation: The sentiment is generated based on the characters, attributes, actions and the binding predicate. In one embodiment, an LSTM is used to train the sentiment.

As a specific example, consider an image where "John took a selfie with Peter". If "john" is a terrorist obtained from the historical data, transactions, library or from third party sources such as websites and criminal databases, the associated sentiment is objectionable.

At the step 404, decision is taken about the content (or parts of it) if it is objectionable. It relates content with characters. Further, in an embodiment, the objectionable content is identified based on the sentiment association, the context-based analysis that additionally factor in user analysis, theme analysis, bibliographic history or origin and the like. As a specific example consider an image of "A person holding a gun and shooting". The content per se is not objectionable. But the character analysis of person identifies the person as a terrorist, then the content is objectionable.

In an embodiment after the identification of the objectionable content in the multimedia content, the user analysis module 216, predicts the potential proliferation of the multimedia content based on the sensitivity index. To compute the sensitivity index, a plurality of parameters is associated with a plurality of values and a weight corresponding to the plurality of values using the historical data from the database 102. The weights of the various parameters present in the multimedia content are added and normalized to get the sensitivity index.

Figure 6:
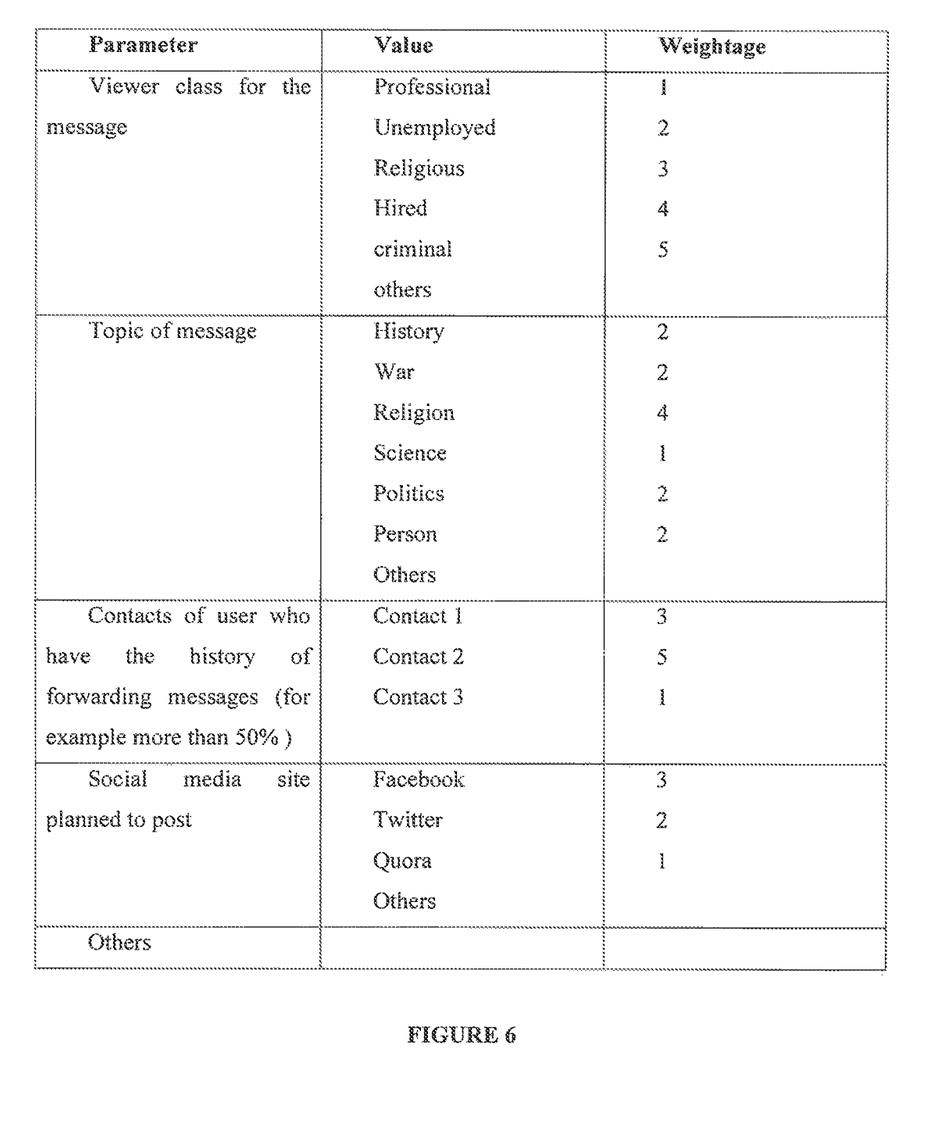
FIG. 6 shows an exemplary table for computing the sensitivity index, in accordance with an embodiment of the present disclosure.

In an embodiment, as a specific example to compute the sensitivity index, a table stored in the database 102 as shown in FIG. 6 is used. One of the columns of the table consists of parameters used to compute sensitivity index comprising of a topic of the multimedia content, intended social media site to post the multimedia content, contacts of the user trying to upload the multimedia content, viewer class for the multimedia content. Further, the columns of the table consist of plurality of values corresponding to each of the parameters and a weightage corresponding to the plurality of values. Consider the parameter "topic of the multimedia content" as shown in an exemplary table, the values associated with the corresponding parameter is the various areas under which the multimedia content can be categorized based on the topics, the theme, the characters, the interactions among the characters present in the multimedia content. Further, for each of the values categorized, a predefined weightage is associated based on the historical data. Using the weightage, a sensitivity index is calculated by adding all the weights corresponding to the values present in the multimedia content followed by normalization.

Consider an example 1, a text message "the president is a fool" for calculating the sensitivity index using the table. The viewer class for the example is Professional, Unemployed, hired (to criticize or praise the president), criminal (to create disturbances), it adds the weightage to 12. The topic of the text message is politics and the corresponding weightage is 2. The contacts of the user say adds to 9 and the social media for posting the text message is Facebook and the corresponding weightage is 3. Thus, the total weightage considering all the parameters is 26, after normalization the sensitivity index would be 6.5.

Consider another example 2 "Czars were incapable" for calculating the sensitivity index using the table. The viewer class is professional and the corresponding weightage is 1. The topic of the text message is History and the corresponding weightage is 2. The contacts of the user say adds to 9. the social media for posting the text message is Quora and the corresponding weightage is 1. Thus, the total weightage considering all the parameters is 13, after normalization the sensitivity index would be 3.25.

Thus, as compared with example 2, the example 1 has higher sensitivity index indicating the text message in example 1 has objectionable content with higher proliferation rate hence the user is alerted to modify the message before uploading.

At the step 303, the user is alerted about the objectionable parts of the multimedia content along with the sensitivity index and the potential proliferation. The user is given an option to remove or modify the objectionable content.

At the step 304, if the user modifies or deletes the objectionable content, the sensitivity values and potential proliferation is recomputed, and the above steps are revisited. If there is no objectionable content, the multimedia content gets uploaded.

In an embodiment, if the user is unwilling to change, the content is uploaded with a special note to social media about the details of the objection. Such annotated content is flagged automatically and may require intervention of social media site moderators and may be prevented from appearing to other social media users or viewers immediately, till a site moderator performs a review of the annotated content.

In another embodiment, the application or any computing unit 100 after identifying the objectionable content in the multimedia content can block the user from uploading the multimedia content.

In another embodiment, the application or any computing unit 100 can remove the objectionable content upon identifying the objectionable content in the multimedia content and further upload the multimedia content.

Computer System

Figure 7:
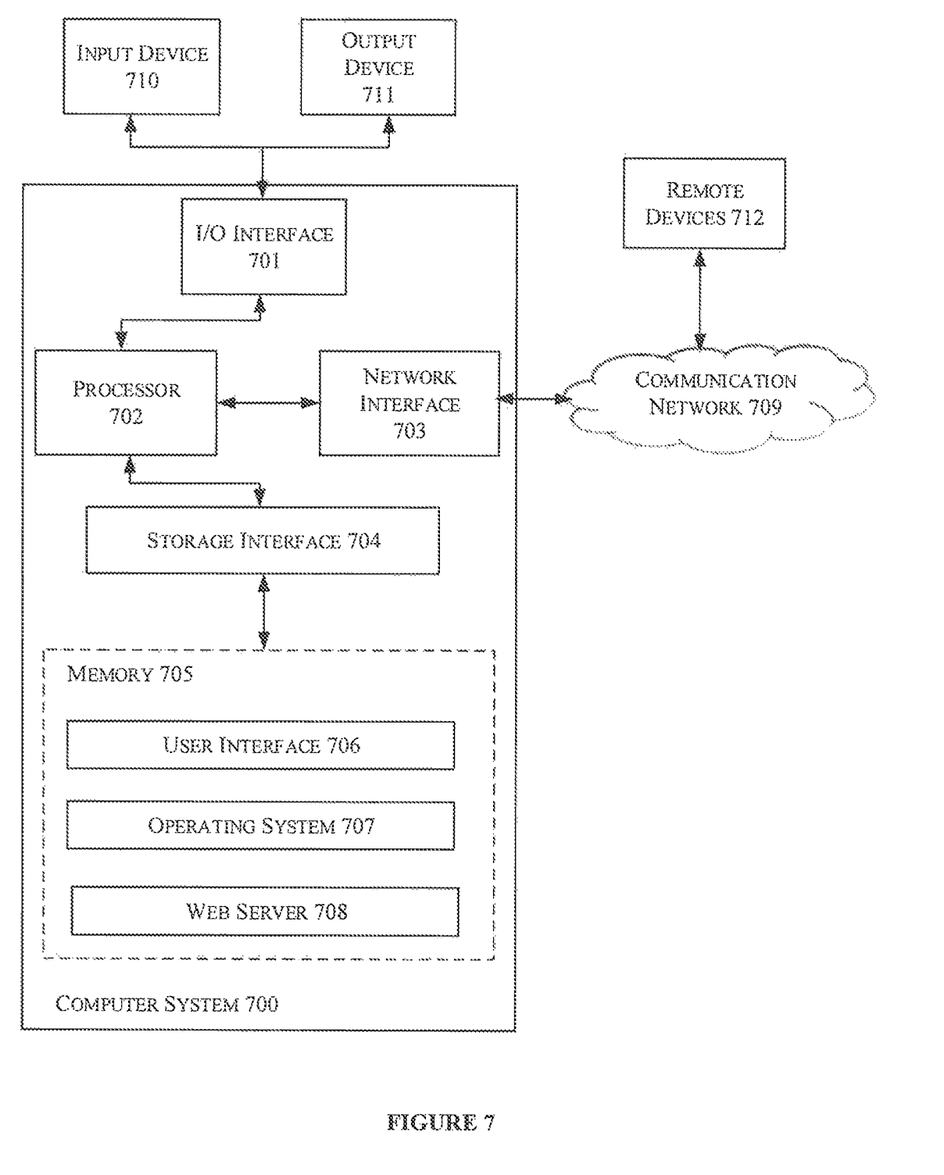
FIG. 7 shows a general-purpose computer system to identify the objectionable content present in a multimedia content before upload in accordance with embodiments of the present disclosure.

FIG. 7 illustrates a block diagram of an exemplary computer system 700 for implementing embodiments consistent with the present disclosure. In an embodiment, the computer system 700 is used to implement the method for identifying the objectionable content in the multimedia content before upload. The computer system 700 may comprise a central processing unit ("CPU" or "processor") 702. The processor 702 may comprise at least one data processor for executing program components for dynamic resource allocation at run time. The processor 702 may include specialized processing units such as integrated system (bus) controllers, memory management control units, floating point units, graphics processing units, digital signal processing units, etc.

The processor 702 may be disposed in communication with one or more input/output (I/O) devices (not shown) via I/O interface 701. The I/O interface 701 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 700 may communicate with one or more I/O devices. For example, the input device 710 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 411 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 700 is connected to the service operator through a communication network 709. The processor 702 may be disposed in communication with the communication network 709 via a network interface 703. The network interface 703 may communicate with the communication network 709. The network interface 703 may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network 709 may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface 703 and the communication network 709, the computer system 400 may communicate with the one or more service operators.

In some embodiments, the processor 702 may be disposed in communication with a memory 705 (e.g., RAM, ROM, etc. not shown in FIG. 7) via a storage interface 704. The storage interface 704 may connect to memory 705 including, without limitation, memory drives, removable disc drives, etc., employing connection protocols such as serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user interface 706, an operating system 707, web server 708 etc.

In some embodiments, computer system 700 may store user/application data 706, such as the data, variables, records, etc. as described in this disclosure. Such databases may be implemented as fault-tolerant, relational, scalable, secure databases such as Oracle or Sybase.

The operating system 707 may facilitate resource management and operation of the computer system 700. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, 10 etc.), Apple iOS, Google Android, Blackberry OS, or the like.

In some embodiments, the computer system 700 may implement a web browser 708 stored program component. The web browser 708 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX, DHTML, Adobe Flash, JavaScript, Java, Application Programming Interfaces (APIs), etc. In some embodiments, the computer system 700 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 700 may implement a mail client stored program component. The mail client may be a mail viewing application, such as Apple Mail, Microsoft Entourage, Microsoft Outlook, Mozilla Thunderbird, etc.

In an embodiment, the computer system 700 may comprise remote devices 712. The computer system 700 may receive the multimedia content for upload from the remote devices 712 through the Commmunicaiton network 709.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 and FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The system described in the present disclosure is used to warn the user about potential proliferation of the objectionable content before uploading the multimedia content over the social media. Further, the system prevents the glorification of the objectionable content by deleting the objectionable content in the multimedia content. Finally, the present disclosure supports both audio or text and image or video content together for identification of the objectionable content.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| REFERRAL NUMERALS: | |
| --- | --- |
| Reference number | Description |
| 100 | Computing unit |
| 101 | User device |
| 102 | Database |
| 103 | Network |
| 201 | I/O interface |
| 202 | Memory |
| 203 | Processor |
| 204 | Data |
| 205 | Topic data |
| 206 | Theme data |
| 207 | Interaction data |
| 208 | Meta data |
| 209 | Other Data |
| 210 | Modules |
| 211 | Topic Identification Module |
| 212 | Theme Identification Module |
| 213 | Character Interaction Identification Module |
| 214 | Sentiment Association Identification Module |
| 215 | Content Immersion Module |
| 216 | User Analysis Module |
| 217 | Alert Generation Module |

What is claimed is:

1. A method of preventing upload of multimedia content with objectionable content into a server, the method comprising:
   receiving, by a computing unit, the multimedia content from a user;
   identifying, by the computing unit, the objectionable content present in the multimedia content, wherein identifying the objectionable content comprises:
      determining one or more characters and an environment hosting the one or more characters from the multimedia content to identify one or more topics and a theme of the multimedia content;
      identifying interactions among the one or more characters in the multimedia content;
      associating sentiments with the one or more characters and actions performed by the one or more characters, wherein the sentiments are associated by computing a sentiment graph, wherein the sentiment graph is generated based on attributes table populated from historical data, action relating to the one or more characters and a machine learning algorithm; and
      determining a relationship between at least one of the theme, the one or more topics, the interactions among the one or more characters, the sentiments of the one or more characters and the sentiments of the actions;
   providing by the computing unit, an alert to the user about the objectionable content present in the multimedia content while uploading to the server; and
   deleting, by the computing unit, the objectionable content present in the multimedia content upon receiving instructions from the user in response to the alert provided to the user, thereby preventing the upload of the multimedia content with the objectionable content to the server.

2. The method of claim 1, wherein the one or more topics in the multimedia content comprises at least one of one or more subjects and one or more objects in the multimedia content.

3. The method of claim 1, wherein identifying the one or more topics in the multimedia content comprising a text comprises:
   determining at least one attention word from a text present in the multimedia content, wherein the attention word is determined by classifying subject from predicate in the text; and
   identifying relative frequency of the subject, wherein the subject is derived as topic based on relative frequency of the subject.

4. The method of claim 1, further wherein identifying the one or more topics in the multimedia content comprising an audio visual content comprises:
   determining at least one of the one or more objects present in the multimedia content,
      wherein the at least one of the one or more objects is determined by at least one of facial recognition, user context and attributes associated with the one or more objects from historical data in the multimedia content.

5. The method of claim 1, wherein identifying the theme is based on at least one of captions, and context graphs in the multimedia content.

6. The method of claim 1, wherein the interactions among the one or more characters is identified by extracting at least one of predicate associated with one or more subjects, and physical adjacency of one or more objects.

7. The method of claim 1, comprises predicting a potential proliferation of the multimedia content with the objectionable content based on sensitivity index derived from weights associated with a plurality of parameters, wherein the plurality of parameters include viewer class, type of social media, the one or more topics and attributes associated with the one or more topics, wherein the user is alerted about the predicted potential proliferation while uploading the multimedia content to the server.

8. The method of claim 1, wherein the user is provided an option to modify the objectionable content present in the multimedia content before uploading.

9. A computing unit for preventing upload of multimedia content with objectionable content into a server comprising:
   a processor; and
   a memory communicatively coupled to the processor, wherein the memory stores the processor instructions, which, on execution, causes the processor to:
      receive the multimedia content from a user;
      identify the objectionable content present in the multimedia content, wherein identifying the objectionable content comprises:
         determining one or more characters and an environment hosting the one or more characters from the multimedia content to identify one or more topics and a theme of the multimedia content,
         identifying interactions among the one or more characters in the multimedia content;
         associating sentiments with the one or more characters and actions performed by the one or more characters, wherein the processor is configured to associate the sentiments by computing a sentiment graph, wherein the sentiment graph is generated based on attributes table populated from historical data, action relating to the one or more characters and a machine learning algorithm; and
         determining a relationship between at least one of the theme, the one or more topics, the interactions among the one or more characters, the sentiments of the one or more characters and the sentiments of the actions;
      alert the user about the objectionable content present in the multimedia content while uploading to the server; and
      delete the objectionable content present in the multimedia content upon receiving instructions from the user in response to the alert provided to the user, thereby preventing the upload of the multimedia content with the objectionable content to the server.

10. The computing unit of claim 9, wherein the one or more topics in the multimedia content comprises at least one of one or more subjects and one or more objects in the multimedia content.

11. The computing unit of claim 9, wherein the processor is configured to identify the one or more topics comprises:
   determining at least one of the one or more objects present in the multimedia content, wherein the at least one of the one or more objects is determined by at least one of face recognition, user context and attributes associated with the one or more objects from historical data in the multimedia content.

12. The computing unit of claim 9, wherein the processor is configured to identify the one or more topics comprises:
   determining at least one of the one or more objects present in the multimedia content,
      wherein the at least one of the one or more objects is determined by at least one of face recognition, user context and attributes associated with the one or more objects from historical data in the multimedia content.

13. The computing unit of claim 9, wherein the processor is configured to identify the theme based on at least one of captions, and context graphs in the multimedia content.

14. The computing unit of claim 9, wherein the processor is configured to identify the interactions among the one or more characters by extracting at least one of predicate associated with the one or more subjects, and physical adjacency of one or more objects.

15. The computing unit of claim 9, wherein the processor is configured to predict a potential proliferation of the multimedia content with the objectionable content based on sensitivity index derived from weights associated with a plurality of parameters, wherein the plurality of parameters include viewer class, type of social media, the one or more topics and attributes associated with the one or more topics, wherein the user is alerted about the predicted potential proliferation while uploading the multimedia content to the server.

16. The computing unit of claim 9, wherein the processor is configured to provide the user an option to modify the objectionable content present in the multimedia content before uploading.

* * * * *